Sept. 9, 1924.  W. A. WATERMAN  1,507,874
ORCHARD VALVE
Filed Nov. 9, 1921

INVENTOR
William A. Waterman

ATTORNEYS.
Westall and Wallace

Patented Sept. 9, 1924.

1,507,874

UNITED STATES PATENT OFFICE.

WILLIAM A. WATERMAN, OF EXETER, CALIFORNIA.

ORCHARD VALVE.

Application filed November 9, 1921. Serial No. 513,975.

*To all whom it may concern:*

Be it known that I, WILLIAM A. WATERMAN, a citizen of the United States, and residing at Exeter, in the county of Tulare and State of California, have invented new and useful Improvements in an Orchard Valve, of which the following is a specification.

This invention relates to a valve structure especially adaptable for irrigating systems.

In irrigating systems employing conduit and pipe, it is the common practice to install valves for controlling the outflow of water. As these valves are exposed to the weather, and, as the water carries sand and grit, it is difficult to maintain the valves water tight on their seats and at the stems. Packing soon wears away due to the grit, and alignment of the valve cover and disk on the seat is difficult.

The objects of this invention are first to provide a valve requiring no packing; second, to provide a construction such that the valve cover and seat are self aligning; and third, to provide a valve that may be easily constructed by reason of expensive machining operations being eliminated.

Figure 1:
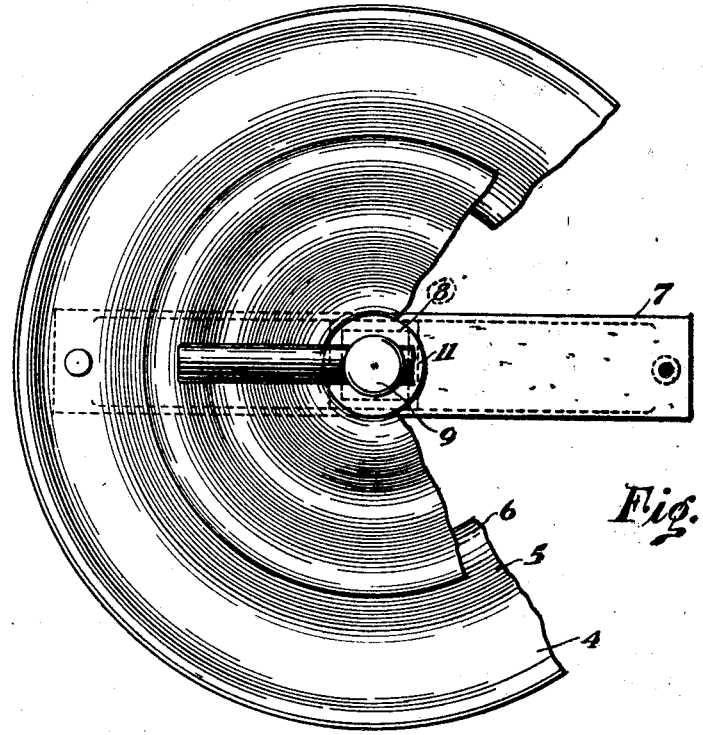
Figure 3:
Figure 2:
Figure 2:
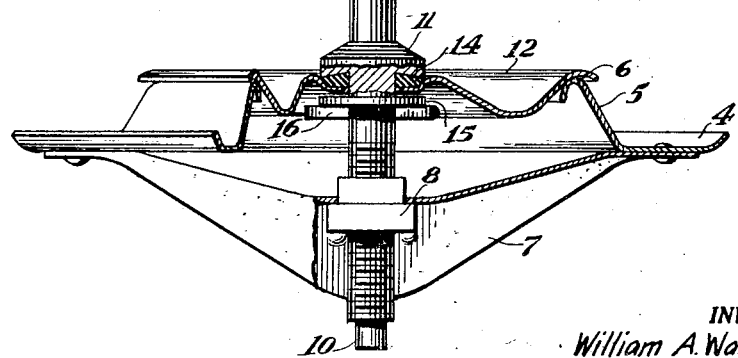

These objects together with other objects and corresponding accomplishments are obtained by means of the embodiment of my invention illustrated in the accompanying drawing, in which:

Fig. 1 is a plan view of a valve upon its base, parts being broken away to better illustrate the relation of the elements thereof; Fig. 2 is a vertical elevation partly in section; and Fig. 3 is a perspective view of the gasket for the stem with a section broken out.

Referring more particularly to the drawing, 4 indicates a base, which is preferably formed of stamped resilient metal with a raised portion 5 ending in a bead 6 at the port opening. The bead forms a seat for the valve cover. Spanning the valve port and secured to the base on the lower side thereof is a bracket 7 having an opening at the center thereof in which is mounted a nut 8 to receive the valve stem. The bracket 7 is preferably made of stamped metal.

Engaged with the nut 8 is a valve stem 9 reduced in diameter at its lower end as indicated by 10 to form a pilot end. The diameter of the reduced portion 10 is the same as the diameter at the bottom of the threads. Formed on the stem 9 is a collar 11 having a concave lower face. Mounted upon the stem below collar 11 is a valve disk or cover 12 having a flaring edge so that when the disk is forced onto the seat it will wedge and form a tight joint. This allows for expansion and permits the valve base to be reamed when it becomes rough. Adjacent the stem, the cover is dished to form a concave recess opposing the concavity in the collar 11. Interposed between collar 11 and the cover 12 in the space formed therebetween is a gasket preferably of ductile metal such as lead and indicated by 14. Holding the valve disk in position is a washer 15 mounted below the disk and spaced therefrom so as to allow the valve disk to rock a slight amount upon the stem and thus provide for self alignment. A cotter pin 16 holds the washer 15 in position.

In Fig. 2, the valve disk is shown in closed position. It is the common practice to remove the valve disk or cover to permit the outflow of water. This is done by unscrewing the stem 9 from the nut 8 in the bracket and lifting the stem with its attached cover from the base. Water then flows up through the port opening. In replacing the valve cover to close the valve, view of the bore of the nut is difficult because of water which covers the same. The pilot end 10 of the stem permits the latter to be inserted in position ready for screwing the stem downwardly. The stem is screwed downwardly, the valve cover 12 aligning itself upon the seat 6 and by its slight rotation caused by friction with the parts of the valve stem, any grit or sand is wiped from the seat. The valve cover is preferably made of stamped metal which is resilient, further aiding in a tight seating of the cover by bending and adjusting itself to any irregularities. The collar 11 forces the gasket 14 against the valve cover compressing the gasket so that it flows against the stem making a tight fit and preventing leakage of water.

What I claim is:

1. A valve comprising in combination a base provided with a seat, a valve stem secured to said seat so as to be moved longitudinally upon turning the stem, a valve cover through which said stem extends loosely mounted on said stem so that it may be tilted, said stem having a collar fixed thereto, said collar having a concavity opposed to said cover, and an annular gasket of ductile material interposed in said concavity and surrounding said stem, whereby upon forcing said cover upon its seat the gasket may be expanded and compressed against said stem to form a leak tight fit.

2. A valve comprising in combination a base provided with a seat, a valve stem engaged by threads with said base so as to be moved longitudinally upon turning of the same, a valve cover through which said stem extends loosely mounted on said stem so that it may be tilted, said stem having a collar fixed thereto, said collar having a concavity opposed to said cover, and an annular gasket of ductile material interposed in said concavity and surrounding said stem whereby upon forcing said cover upon its seat the gasket may be expanded and compressed against said stem to form a leak tight fit.

3. A valve comprising in combination a base provided with a seat, a bracket spaning the port in said base upon its lower side and provided with a threaded bore, a valve stem engaged with the thread in said bore so as to be moved longitudinally upon turning of the stem, a valve cover through which said stem extends loosely mounted on said stem so that it may be tilted, said stem having a collar fixed thereto, said collar having a concavity opposed to said cover, and an annular gasket of ductile material interposed in said concavity and surrounding said stem whereby upon forcing said cover upon its seat the gasket may be expanded and compressed against said stem to form a leak tight joint.

4. A valve comprising in combination a base provided with a seat having a raised edge, a valve stem secured to said base so as to be moved longitudinally upon turning of the stem, a valve cover of resilient sheet metal having a bead for registration with the raised portion of said seat, said cover being loosely mounted upon said stem so that it may be tilted with respect thereto, said stem having a collar fixed thereto, said collar having a concavity opposed to said cover, and an annular gasket of ductile material interposed in said concavity and surrounding said stem whereby upon forcing said cover upon its seat the gasket may be expanded and compressed against said stem to form a leak tight joint.

In witness that I claim the foregoing I have hereunto subscribed my name this 3rd day of November.

WILLIAM A. WATERMAN.